United States Patent [19]

Herpel et al.

[11] Patent Number: 5,450,133
[45] Date of Patent: Sep. 12, 1995

[54] MOTION COMPENSATED ADAPTIVE VERTICAL FILTERING OF AN IMAGE REPRESENTATIVE SIGNAL

[75] Inventors: Carsten Herpel; Dietmar Hepper, both of Hanover, Germany

[73] Assignee: Deutsche Thomson-Brandt GmbH, Villengen-Schwenningen, Germany

[21] Appl. No.: 134,786

[22] Filed: Oct. 12, 1993

[30] Foreign Application Priority Data

Apr. 12, 1991 [DE] Germany .................. 41 11 980.0

[51] Int. Cl.$^6$ ............................................. H04N 7/12
[52] U.S. Cl. .................................... 348/452; 348/701
[58] Field of Search ............... 348/452, 699, 700, 701; H04N 7/22, 7/04

[56] References Cited

U.S. PATENT DOCUMENTS

| | | | |
|---|---|---|---|
| 4,730,217 | 3/1988 | Tonge et al. | 348/700 X |
| 5,162,907 | 11/1992 | Keating et al. | 348/701 X |
| 5,303,045 | 4/1994 | Richards et al. | 348/699 X |
| 5,347,312 | 9/1994 | Saunders et al. | 348/700 X |
| 5,376,971 | 12/1994 | Kadono et al. | 348/699 |

FOREIGN PATENT DOCUMENTS

| | | | |
|---|---|---|---|
| 0333069 | 9/1989 | European Pat. Off. | H04N 5/14 |
| 390660 | 10/1990 | European Pat. Off. | H04N 7/01 |
| 414113 | 2/1991 | European Pat. Off. | H04N 7/137 |

OTHER PUBLICATIONS

An HDTV Broadcasting System Utilizing A Bandwidth Compression Technique-Muse, by Y. Ninomiya et al., IEEE Transactions on Broadcasting, vol. BC-33, No. 4, Dec. 1987.
Vertical Sampling Rate Decimation and Line-Offset Decimation of Colour Difference Signals, by B. Girod et al., Signal Processing, Feb. 1989.
HD-MAC: A Step Forward in the Evolution of Television Technology, by M. J. J. C. Annegarn et al., Philips Technical Review, Aug. 1987.
Interframe Coding With Two-Dimensional Motion Compensation, by T. S. Huang et al., ICASSP '82 Proceedings, May 3–5, 1982, vol. 1, IEEE.
Model Based Movement Compensation and Interpolation for ISDN Videotelephony, by F. May, IEEE International Symposium on Circuits and Systems–Proceedings, Jun. 7–9, 1988, vol. 1, IEEE.

*Primary Examiner*—Victor R. Kostak
*Assistant Examiner*—John W. Miller
*Attorney, Agent, or Firm*—Joseph S. Tripoli; Eric P. Herrmann; Ronald H. Kurdyla

[57] ABSTRACT

A process of image signal coding provides motion vectors for blocks of picture elements (pixels). An array of motion vectors for pixel blocks may be used to generate a zoom and pan vector for a full image. When the format of a vertically subsampled image is changed before coding, motion parameters for a full image are used to obtain maximum local resolution after subsampling. Remaining image areas which have not been fully motion compensated are detected by an alteration (change) detector and are vertically filtered in a field.

8 Claims, 1 Drawing Sheet

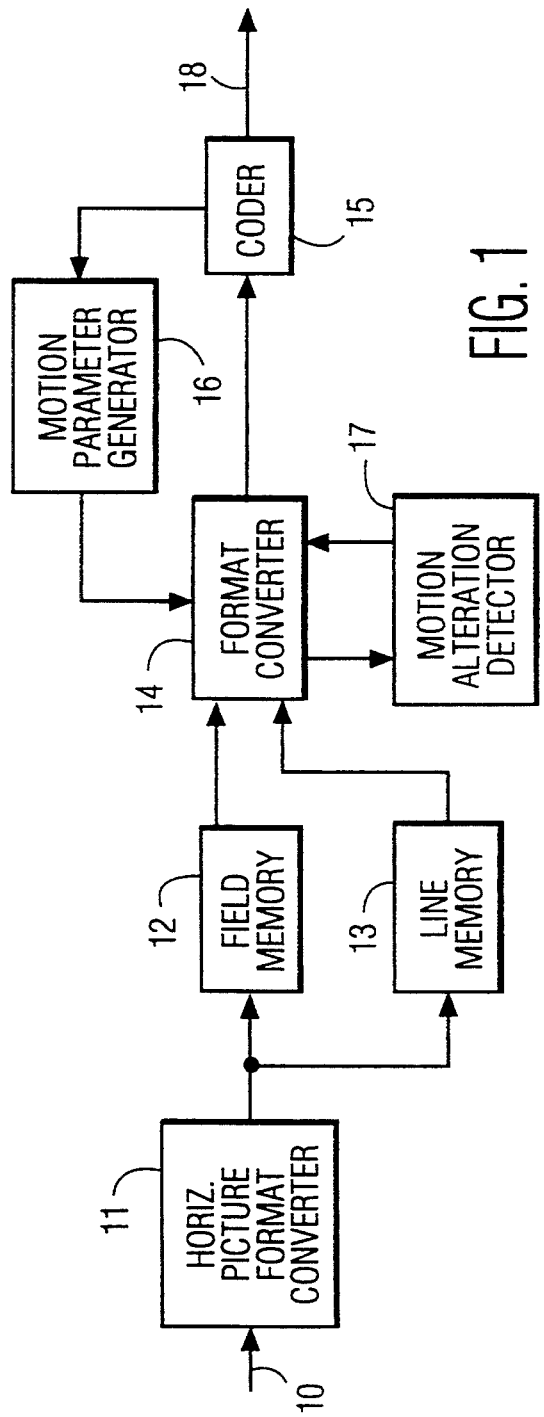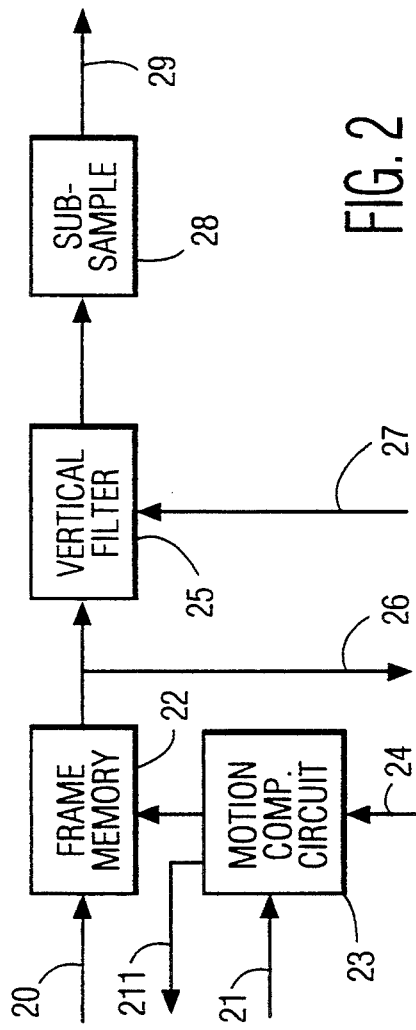

MOTION COMPENSATED ADAPTIVE VERTICAL FILTERING OF AN IMAGE REPRESENTATIVE SIGNAL

This is a continuation-in-part of PCT application PCT/EP 92/00763 filed Apr. 4, 1992 by Carsten Herpel and Dietmar Hepper, titled "Method for Coding".

BACKGROUND OF THE INVENTION

This invention concerns a method for motion-compensated vertical filtering of a video signal.

EP 0 414 113 describes a method in which a zoom and pan vector (enlarging and panning vector) for a complete picture can be generated from a field of motion vectors derived, for example, from blocks of picture elements (pixels).

SUMMARY OF THE INVENTION

A method according to the present invention involves coding in which picture signals representing picture elements are motion-compensated and coded with motion parameters. Motion parameters are used for motion compensation, picture by picture, with a picture format conversion process which occurs prior to coding. In such process picture signals are sub-sampled (sub-nyquist sampling) at least in the vertical direction during the picture format conversion. Incorrectly motion-compensated picture elements, as a function of the picture-type motion compensation, are detected by means of an alteration detection process. The picture elements are vertically filtered within an image frame in the case of correct motion compensation, and are vertically filtered in an image field in the case of incorrect motion compensation.

With reduced data (data compression) picture coding and motion compensation, motion vectors are generated for individual pictures or parts of pictures. To reduce the data further, picture signals may be sub-sampled prior to coding.

If picture signals exhibit a line interlace format before sub-sampling and are to exhibit a progressive format after coding, interlace-to-progressive picture format conversion can take place before coding. Progressive picture signals can, for example, be obtained by omitting every second field. However, without appropriate prefiltering, aliasing is introduced into the subsampled signal, and vertical resolution of a static picture before sub-sampling is reduced by a factor of two.

Motion-adaptive vertical filtering can also occur prior to sub-sampling. Generally, however, in this case larger areas of the picture are considered as dynamic. As a result, vertical resolution in these areas is reduced by more than a factor of two.

With series processing including picture format conversion with sub-sampling and motion-compensated coding after coding picture n, motion parameters for the magnitude of zoom and pan between picture n−2 and picture n−1 are present. As these parameters do not change suddenly from picture to picture in conventional television picture signals, the zoom and pan parameters which are present can be used to predict as yet unknown corresponding parameters between picture n-1 and picture n.

With picture format conversion, the second field of picture n is image translated to the temporal and spatial position of the first field of picture n with the help of the zoom and pan parameters. To reduce noise, the second field of picture n-1 and of picture n can now be advantageously image translated to the temporal and spatial position of the first field of picture n with the help of the zoom and pan parameters.

For every picture element in the first field of picture n, an alteration detector determines whether non-compensated motion, for example, within individual areas of the picture which have different motion parameters compared to those for the picture, is still present. If this is the case, picture elements from such areas of the picture are prefiltered, for sub-sampling, with the help of the corresponding picture elements of the respective field. In other cases, filtering uses picture elements from the motion-compensated second field of picture n, or respectively, from the motion-compensated second fields of pictures n and n−1 and the current picture element itself (filtering in the motion-compensated frame). The use of three fields results in noise reducing temporal filtering.

Depending on picture material, the local resolution of picture signals generated during format conversion is very close to the theoretical limits of the system or the limits imposed by filter technology, and contains no aliasing caused by sub-sampling without prefiltering. Separate motion estimation is not required for format conversion in order to perform motion-compensated temporal prefiltering.

BRIEF DESCRIPTION OF THE DRAWING

FIG. 1 is a picture coding circuit using a picture format converter connected in series with a coder.

FIG. 2 shows details of the picture format converter of FIG. 1.

DESCRIPTION OF THE PREFERRED EMBODIMENT

In FIG. 1, a picture format converter 14 is connected in series with a coder 15. Connected ahead of converter 14 is a field memory 12 and a line memory 13, the inputs of which are connected to each other. In the case of sub-sampling in the horizontal direction, this is carried out in conjunction with a corresponding prefiltering, advantageously in a horizontal picture format converter 11 which is connected ahead of field memory 12 and line memory 13. The necessary processing speed in the following circuits is therefore reduced. A line interlaced picture signal with pictures Sn. n=1, 2, 3, ... , is applied to an input 10. Afterwards, a filtered and sub-sampled picture signal sn is available at an output of converter 14, leading to the coder.

A motion parameter generator 16 generates picture-by-picture motion parameters pn−1 for a pair of pictures sn−2, Sn−1 (z, vx, vy) from the block-by-block motion parameters, for example, for zoom and pan, originating from coder 15. This can, for example, be carded out as described in EP 0 414 113. In this case 'z' is the zoom factor, 'vx' the translation (offset) in the horizontal direction and 'vy' the translation in the vertical direction between two pictures at a temporal interval of 1/25 s. Advantageously, the necessary processing speed in the picture format converter is reduced by the picture-by-picture preparation and processing of the motion parameters.

Motion compensation in the second fields $S^2n-1$ and $S^2n$ to the time of the respective associated first field Sin with a temporal difference of plus/minus 1/50 s, requires dividing the motion parameters by two. Since the local horizontal resolution in the field, apart from a possible horizontal picture format conversion, is twice as large as the vertical resolution, the motion parameters to be used in picture format converter 14 are:

$Z = z/2$
$Vx = vx$
$Vy = vy/2$

The compensated (translated) second fields $S^{2k}n$, $S^{2k}n-1$ are:

$$S^{2k}n\ (x,y) = S^2n\ ((1-Z)*x - Vx,\ (1-Z)*y - Vy)$$

$$S^{2k}n-1\ (x,y) = S^2n-1\ ((1+Z)*x - Vx,\ (1-Z)*y + Vy)$$

where (x,y) originate from a system of coordinates with its origin at the center of the picture.

Using an alteration (change) detector 17, the absolute values of the difference of the motion-compensated second fields $S^{2k}n-1$, $S^{2k}n$ are summed to a value Sigma for each position (x,y) in the first field Sin, in a window of picture element positions arranged symmetrically. The size of the window is variable, but preferably contains 5×4 picture elements.

If the value Sigma does not exceed a first threshold T1, then filtering in the motion-compensated translated frame is performed as follows:

$$S^{1/}n(x,y) = fil^{Pr}n(x,y).$$

If the value Sigma exceeds a second, higher threshold T2, then filtering in the field is performed as follows:

$$S^{1/}n(x,y) = fil^h n(x,y).$$

If the value Sigma lies between the two thresholds, then the result is a linear combination of the two filter signals:

$$S^{1/}n(x,y) = r*fil^{Pr}n(x,y) - (1-r)*fil^h n(x,y),$$

where $r = (T2 - Sigma)/(T2 - T1)$.

The thresholds can, for example, be selected as T1 = 6*(number of picture elements in window) or T2 = 12*(number of picture elements in window).

Alteration detection can be performed, for example, by a picture element motion detector as described in EP 0 333 069. Alteration detector 17 receives corresponding input data from picture format converter 14 and sends the value Sigma back.

The number of lines stored in line memory 13 corresponds to the maximum motion compensation in the vertical direction.

Advantageously, the filter length for vertical filtering corresponds to the window used for alteration detection in the vertical direction.

Valid for the vertical frame filter may be:

$$fil^{Pr}n(x,Y) = (k0*S^1n\ (x,y) +$$
$$k1*S^{2k}n - 1\ (x,y - 1) + S^{2k}n\ (x,y - 1)) +$$
$$k1*S^{2k}n - 1\ (x,y) + S^{2k}n\ (x,y)) +$$
$$k2*S^{2k}n - 1\ (x,y + 1) + S^{2k}n\ (x,y + 1)) +$$
$$k2*S^{2k}n - 1\ (x,y - 2) + S^{2k}n\ (x,y - 2)))/(k0 + 4*(k1 + k2)),$$

where k0 = 128, k1 = 75, k2 = −11.

In this case $S^2n\ (x,y-1)$ in the frame lies directly above $S^1n\ (x,y)$, and $S^2n\ (x,y)$ lies directly below it.

Valid for the vertical field filter may be:

$$fil^h n(x,y) = (k0*S^1n\ (x,y) +$$
$$k1*(S^1n\ (x,y - 1) + S^1n\ (x,y + 1)))/k0 + 2*k1),$$

Video signal sn to be coded is obtained from the first field $S^{1/}n$ after it has been sub-sampled, for example, by a factor of 2 horizontally and vertically.

Input signals Sn at input 10 can have an interlaced format 625L/50Hz/2:1 with 720*576 active picture elements for the luminanee component, and 360*576 active picture elements for the ehrominanee components. The chrominance components can be processed in the same way as the luminanee component, or also generally filtered in the field.

Output signals sn from picture format converter 14 and in coded form at input 18 can, for example, have a progressive picture format with 360*288 active picture elements for the luminanee component, and 180*144 active picture elements for the chrominance components.

FIG. 2 shows picture format converter 14 in more detail. A first input 20 is connected to a frame memory 22 and receives picture signals delayed by one field from the respective first field from field memory 12. A second input 21 is connected to a motion-compensation circuit 23 and receives line-delayed picture signals from the respective second field from line memory 13. A third input 24 is also connected to the motion-compensation circuit and receives motion parameters from motion parameter generator 16. A fourth input 27 receives output signals from alteration detector 17.

Picture signals from line memory 13 are motion-compensated by picture-by-picture motion parameters from the motion parameter generator according to known methods, and are coupled to frame memory 22. The lines in the line memory can be addressed via output 211. Frame signals with maximum vertical local resolution are now present at the output of the frame memory. These signals are filtered by subsequent vertical filter 25, one picture element after another, corresponding to the signal at the fourth input 27 in the frame or field, and are also coupled via output 26 to alteration detector 17.

A sub-sampling stage 28 is connected downstream from the vertical filter, and picture signal sn can be acquired at output 29 of sub-sampling stage 28.

The picture-by-picture motion parameters may contain zoom and/or pan factors applicable to a complete picture, or image translating vectors for sections within the pictures. For example an image translating vector may be formed for picture element blocks of 8*8 picture elements.

We claim:

1. A method of motion compensated vertical filtering of a signal representing an image including picture elements, comprising the steps of:
   (a) motion compensation image translating using picture area motion parameters, at least one second field $S^2n$ into a temporal and corresponding spatial position of a first field $S^1n$ where n = 1, 2, 3 ...;
   (b) detecting correctly and incorrectly motion compensated picture elements of the motion compensated second field;
   (c) vertically filtering and vertically subsampling picture elements either within a field when incorrect motion compensation is detected or within a frame formed by said first field and said image translated second field When correct motion compensation is detected; and (d) motion compensation coding said vertically subsampled image signal, thereby producing motion information used for generating said picture area motion parameters.

2. A method according to claim 1, including the step of:
   subsampling said image signal relative to an original image signal in the horizontal direction by a factor of two, prior to said format conversion subsampling, whereby an image signal before image subsampling format conversion is in a line interlaced format, and after said format conversion is in a progressive format.

3. A method according to claim 1, including the step of:
   motion compensation image translating, before said filtering and subsampling, a second field $S^2n$ and a second field $S^2n-1$ of a preceding frame $Sn-1$ into corresponding spatial and temporal locations of said corresponding first field $S^1n$ whereby said two image translated fields $S^{2k}n$ and $S^{2k}n-1$ are averaged.

4. A method according to claim 1, including the step of:
   adding the absolute values of the differences of motion compensated second fields $S^{2k}n-1$ and $S^{2k}n$ upon detecting said incorrectly motion compensated picture elements to form a value S for each picture element in said first field $S^1n$ in a window of element positions arranged symmetrically thereto, wherein said window comprises $5 \times 4$ picture elements.

5. A method according to claim 4, wherein
   said filtering occurs in a motion compensated frame if said value S is less than or equal to a first threshold value T1 to produce a frame filtered signal; and
   said filtering occurs in a field if said value S is greater than a second, higher, threshold value T2 to produce a field filtered signal.

6. A method according to claim 5, including the step of linearly combining said frame filtered signal and said field filtered signal if said value S is between said threshold values T1 and T2.

7. A method according to claim 5, wherein said first threshold value T1 has a value approximately six times the number of picture elements in said window; and said second threshold value T2 has a value approximately twelve times the number of picture elements in said window.

8. A method according to claim 1, wherein said picture area motion parameters include zoom and panning parameters.

* * * * *